(12) United States Patent
Lim

(10) Patent No.: US 12,188,444 B2
(45) Date of Patent: Jan. 7, 2025

(54) APPARATUS AND METHOD

(71) Applicant: ROBERT LIM INVENTIONS LIMITED, Saltney (GB)

(72) Inventor: Robert Lim, Saltney (GB)

(73) Assignee: ROBERT LIM INVENTIONS LIMITED, Wales (GB)

( * ) Notice: Subject to any disclaimer, the term of this patent is extended or adjusted under 35 U.S.C. 154(b) by 573 days.

(21) Appl. No.: 17/418,673

(22) PCT Filed: Dec. 23, 2019

(86) PCT No.: PCT/GB2019/053696
§ 371 (c)(1),
(2) Date: Jun. 25, 2021

(87) PCT Pub. No.: WO2020/136377
PCT Pub. Date: Jul. 2, 2020

(65) Prior Publication Data
US 2022/0074382 A1 Mar. 10, 2022

(30) Foreign Application Priority Data

Dec. 28, 2018 (GB) ...................................... 1821258

(51) Int. Cl.
*B01D 53/18* (2006.01)
*B01D 53/14* (2006.01)
*F03B 17/02* (2006.01)

(52) U.S. Cl.
CPC .......... *F03B 17/02* (2013.01); *B01D 53/1425* (2013.01); *B01D 53/1475* (2013.01); *B01D 53/18* (2013.01); *B01D 2252/20484* (2013.01); *B01D 2257/2066* (2013.01); *B01D 2257/404* (2013.01); *B01D 2257/7025* (2013.01); *B01D 2258/06* (2013.01); *F05B 2240/24* (2013.01)

(58) Field of Classification Search
CPC B01D 53/18; B01D 53/1425; B01D 53/1475; F03B 17/02
See application file for complete search history.

(56) References Cited

U.S. PATENT DOCUMENTS

| | | | |
|---|---|---|---|
| 2001/0028120 A1 | 10/2001 | Hinada et al. | |
| 2003/0145589 A1 | 8/2003 | Tillyer | |
| 2005/0252206 A1* | 11/2005 | Holmevik | F03G 7/10 60/495 |
| 2012/0090312 A1 | 4/2012 | Wilson et al. | |

(Continued)

FOREIGN PATENT DOCUMENTS

| | | |
|---|---|---|
| GB | 2069619 A | 8/1981 |
| GB | 2229228 A | 9/1990 |

(Continued)

*Primary Examiner* — Robert A Hopkins
(74) *Attorney, Agent, or Firm* — Thomas |Horstemeyer, LLP

(57) ABSTRACT

An apparatus (1) for generating power is provided. The apparatus comprises: at least one pocket (2a-h) for collecting inlet gas which rises through a liquid in which the at least one pocket may be located; an output rotor (4); and a greenhouse gas scavenger (6) for removing greenhouse gas from an inlet gas; the apparatus being configured so that collection of inlet gas causes movement of the pocket, the pocket being coupled to the output rotor so that movement of the pocket causes rotation of the output rotor. A method is also provided.

20 Claims, 3 Drawing Sheets

(56) References Cited

U.S. PATENT DOCUMENTS

| | | |
|---|---|---|
| 2012/0269690 A1 | 10/2012 | Iijima et al. |
| 2013/0011257 A1 | 1/2013 | Lim |
| 2014/0348641 A1* | 11/2014 | Wilson, Sr. ............. F03B 17/02 |
| | | 415/151 |
| 2015/0298051 A1 | 10/2015 | Kuopanportti et al. |
| 2017/0266607 A1 | 9/2017 | Watando et al. |
| 2018/0003149 A1 | 1/2018 | Mayrand |

FOREIGN PATENT DOCUMENTS

| | | | |
|---|---|---|---|
| JP | 2008200589 A * | 9/2008 | ......... B01D 53/1475 |
| JP | 2012117401 A | 6/2012 | |
| KR | 10-2010-0058079 A | 6/2010 | |
| WO | 2010/149972 A2 | 12/2010 | |
| WO | 2011/114117 A2 | 9/2011 | |

* cited by examiner

APPARATUS AND METHOD

CROSS-REFERENCE TO RELATED APPLICATIONS

This application is the 35 U.S.C. § 371 national stage application of PCT Application No. PCT/GB2019/053696, filed Dec. 23, 2019, where the PCT claims priority to, and the benefit of, the GB application, filed Dec. 28, 2018, having serial no. 1821258.9. Both applications are herein incorporated by reference in their entireties.

BACKGROUND OF THE INVENTION

The present disclosure relates to an apparatus for generating power and an apparatus for removing greenhouse gas, such as carbon dioxide, from a greenhouse gas-containing gas.

The present invention concerns an apparatus for generating power. The invention also concerns a method for generating power and a method of removing greenhouse gas, such as carbon dioxide, from a greenhouse gas-containing gas.

It is generally acknowledged that at least some undesirable global warming is caused by the amount of greenhouse gases, such as methane and carbon dioxide in the atmosphere, and that it is desirable to remove greenhouse gases, such as carbon dioxide, from the atmosphere. Several methods have been proposed for removing carbon dioxide from the atmosphere, for example, by reacting an amine with carbon dioxide to form a carbamate. Such methods have often been thought to be too expensive to be worthwhile, and energy is needed to regenerate the amine from the carbamate by heating the carbamate.

It is also known to create power from the buoyancy of gases, the buoyancy of a gas released into a liquid causing a pocket receiving the gas to move, for example, as described in WO2011/114117. Typically, a plurality of such pockets are provided around the circumference of a rotatable body. The buoyancy of the gas causes movement of the pocket receiving the gas and therefore rotation of the rotatable body. The rotating body may cause a shaft to rotate, thereby generating electricity.

The present invention seeks to mitigate the above-mentioned problem. Alternatively or additionally, the present invention seeks to provide an improved apparatus for generating power from the buoyancy of a gas and/or an improved apparatus for removing greenhouse gas, such as methane and/or carbon dioxide, from a greenhouse gas-containing gas.

SUMMARY OF THE INVENTION

The present invention provides, according to a first aspect of the invention, an apparatus for generating power comprising:
 at least one pocket for collecting inlet gas which rises through a liquid in which the at least one pocket is locatable;
 an output rotor; and
 a greenhouse gas scavenger for removing greenhouse gas from the inlet gas;
 the apparatus being configured so that collection of gas causes movement of the pocket, the pocket being coupled to the output rotor so that movement of the pocket causes rotation of the output rotor.

The term "inlet gas" is merely used to differentiate that gas from greenhouse gas which is typically but one or more components of the inlet gas. The applicant has discovered that it is possible to use a gas containing one or more greenhouse gases, such as methane and carbon dioxide, to generate power, such as electrical power, while removing one or more of the greenhouse gases from that inlet gas. The pocket is typically located in a liquid, with the buoyancy of the gas in the liquid causing movement of the pocket which causes movement of the output rotor. The pocket is typically one of several such pockets coupled to a rotatable main body which is located in a liquid. Those skilled in the art will realise that the gas and liquid are not necessarily part of the apparatus of the present invention. Throughout this specification, the term "greenhouse gas" refers to a gas that is capable of contributing to the greenhouse effect by absorbing and re-emitting infrared radiation, but excludes water vapour. The greenhouse gas scavenger may optionally be for removing one or more of carbon dioxide, methane, nitrous oxide, a chlorofluorocarbon (such as CFC-12), a hydrofluorocarbon (such as HFC-23), sulphur hexafluoride and nitrogen trifluoride from the inlet gas. The greenhouse gas scavenger may optionally be for removing one or both of carbon dioxide and methane from the inlet gas, and optionally for removing methane and optionally for removing carbon dioxide. Typically, the greenhouse gas scavenger will only be capable of removing one greenhouse gas (such as one of carbon dioxide and methane), but not both carbon dioxide and methane.

The greenhouse gas scavenger may optionally remove greenhouse gas by reacting with said greenhouse gas. The greenhouse gas scavenger may optionally be a carbon dioxide scavenger which removes carbon dioxide by reaction with the carbon dioxide. The carbon dioxide scavenger may comprise a base (such as hydroxide), a $CO_2$-binding mineral or an amine. The amine may additionally comprise at least one —OH group. The amine may be a primary or secondary amine. The amine may be one or more of diethanolamine, monoethanolamine, methyldiethanolamine, diisopropanolamine and aminoethoxyethanol (diglycolamine). Such amines may react with carbon dioxide to form a carbamate. The carbon dioxide scavenger may be provided as, or in, a liquid. For example, the amines mentioned above form aqueous solutions. Alternatively, a solution or suspension of a base may be used. If the greenhouse gas scavenger, such as a carbon dioxide scavenger, is provided as, or in, a liquid, then the at least one pocket may be located in said liquid.

The apparatus may comprise a heater for heating the greenhouse gas scavenger in a region in which the greenhouse gas scavenger is in contact with greenhouse gas. The reaction between the greenhouse gas and the greenhouse gas scavenger may be faster at above-ambient temperature. The heater may be powered by the output rotor (for example, indirectly, with motion of the output rotor driving a dynamo or similar which generates power which is used to power the heater).

The apparatus may comprise a plurality of pockets for collecting gas. The plurality of pockets may be mutually spaced. The pockets are optionally coupled so that movement of one pocket (for example, a pocket in which gas has collected) is associated with movement of at least one other, and preferably all of the other, pockets. The pockets may optionally be coupled by virtue of the pockets being associated with a common main body. Those skilled in the art will realise that typically not all of the pockets collect gas at the same time. For example, the apparatus will optionally be configured so that a small number of pockets (for example, one, two or three, and optionally one or two) receive gas at any one point in time.

The at least one pocket (and optionally more than one and optionally each pocket) may be associated with a rotatable main body so that movement of said pocket causes rotation of the main body. The main body may be coupled to the output rotor so that rotation of the main body is associated with rotation of the output rotor. The at least one pocket (and optionally more than one and optionally each pocket) may be coupled to the main body. The at least one pocket (and optionally more than one and optionally each pocket) may, for example, be integral with, or connected to, the main body. The main body is optionally generally disk-shaped.

The main body is typically located in a liquid into which greenhouse gas-containing gas is introduced. The gas rises and collects in one or more pockets. The main body and liquid are optionally located in a container which inhibits loss of the liquid therefrom. The liquid may be, or may comprise, the greenhouse gas scavenger, for example, an amine, such as those discussed above.

The apparatus optionally comprises a gas inlet for delivering inlet gas to at least one pocket. The gas inlet may be coupled to a source of inlet gas. The source of inlet gas may comprise a pump or other means for transporting inlet gas to the gas outlet. The source of inlet gas may comprise an intake for receiving gas from the ambient atmosphere. The apparatus may comprise a power source for providing power to the pump or other means for transporting inlet gas. The power source may be a low carbon power source, and may be operable based on wind, wave, tidal, thermal or solar energy. The source of inlet gas may comprise a means for storing gas, such as a gas receptacle, such as a gas cylinder. The pump or other means for transporting inlet gas may be configured to deliver inlet gas to the means for storing inlet gas. The means for storing inlet gas may be configured to deliver stored inlet gas to the gas outlet.

The apparatus may be provided with a gas breaker for breaking a stream of inlet gas into bubbles or for breaking bubbles into smaller bubbles. When inlet gas is delivered into the apparatus, it may typically be delivered as a stream of inlet gas (i.e. unbroken flow) or as a plurality of bubbles. A stream of inlet gas will typically spontaneously break into a plurality of bubbles as it rises through the liquid, but a gas breaker may be positioned so that it is located in a stream of inlet gas, and in this position, it breaks the stream of gas into bubbles. The gas breaker may be located in a gas flow path upstream of the pocket and optionally downstream of the gas outlet, if present. The gas breaker may be located in a pocket; a gas breaker located in a pocket may comprise a mesh, for example, a three-dimensional mesh. A mesh may be interlaced or interwoven, for example. A mesh may be formed from one or more elongate members (such as a ribbon) which is folded, bent or otherwise shaped so as to form a mesh structure. The gas breaker may provide a suitable surface for the interaction of greenhouse gas and greenhouse gas scavenger. A stream of inlet gas is essentially a continuous flow of inlet gas until it is caused to be interrupted. The gas breaker either breaks a stream of inlet gas into bubbles or reduces the bubble size of existing bubbles which pass into or through the gas breaker, possibly increasing residency time of the inlet gas in the pocket, which may increase contact time between the gas and the carbon dioxide scavenger. The gas breaker may comprise a plurality of apertures or openings. The gas breaker may comprise a mesh, for example, a two-dimensional mesh or a three-dimensional mesh. Furthermore, breaking of a stream of inlet gas into bubbles and the breaking of larger bubbles into smaller bubbles increases the surface area of contact between the gas and the surrounding liquid. If the surrounding liquid comprises the carbon dioxide scavenger, then such an increase in surface area is beneficial.

The or each gas breaker may comprise a rotatable member, such as a rotatably-mounted multi-lobed spinner. The rising inlet gas may cause rotation of the spinner which, in turn, may break a stream of inlet gas into bubbles or break bubbles into smaller bubbles.

The apparatus may comprise a first gas breaker configured to break a stream of inlet gas into bubbles or break at least some bubbles into smaller bubbles which pass therethrough or therepast, and a second gas breaker configured to break a stream of inlet gas or at least some bubbles into smaller bubbles which pass into the second gas breaker. Alternatively or additionally, the apparatus may comprise a first gas breaker configured to break a stream of inlet gas into bubbles or at least some bubbles into smaller bubbles which pass therethrough or therepast, and a plurality of gas breakers, each being configured to break a stream of inlet gas into bubbles or at least some bubbles into smaller bubbles which pass into said second gas breaker.

The apparatus may comprise a mesh, for example, a three-dimensional mesh. Said mesh may be located in a pocket. If the apparatus comprises more than one pocket, then a mesh may be located in more than one pocket and optionally each pocket. Whilst not wishing to be bound by theory, it is understood that the mesh increases the contact area between the greenhouse gas-containing inlet gas and the greenhouse gas scavenger and/or provides a suitable surface for the interaction of greenhouse gas scavenger and greenhouse gas. A mesh may be interlaced or interwoven, for example. A mesh may be formed from one or more elongate members (such as a ribbon) which is folded, bent or otherwise shaped so as to form a mesh structure.

The apparatus may comprise a means for retaining gas in at least one pocket. Such a means for retaining gas in a pocket may increase the time for which gas is in contact with the greenhouse gas scavenger. The means for retaining gas may comprise a porous material i.e. a material having pores. The means for retaining gas in a pocket may be located in a pocket. More than one pocket and optionally each pocket may be provided with means for retaining gas in a pocket. It is also believed that a porous material may facilitate the production of smaller bubbles which may increase the interaction between the gas and any adjacent liquid, which may be beneficial if the liquid is, or contains, a greenhouse gas scavenger.

The apparatus may be provided with gearing to reduce the speed of movement of the pocket. This may assist in retaining the gas in contact with the greenhouse gas scavenger.

The apparatus may optionally comprise one or more means for increasing the interaction between the inlet gas and the greenhouse gas scavenger. Such means may comprise a stirrer, shaker, vibrator or reciprocator, for example. Such means may comprise a means for increasing the surface area of said inlet gas, such as a gas breaker, as described above. Such means may comprise a mesh, for example, a two-dimensional or three-dimensional mesh. A mesh may be interlaced or interwoven, for example. A mesh may be formed from one or more elongate members (such as a ribbon) which is folded, bent or otherwise shaped so as to form a mesh structure.

The greenhouse gas scavenger may typically require regeneration to regenerate its greenhouse gas removal capability. The apparatus may comprise a regeneration region for the regeneration of the greenhouse gas scavenger. If the greenhouse gas scavenger comprises or is in the form of a liquid, then the regeneration region may be in fluid communication with the region in which the at least one pockets are located. This facilitates transfer of the greenhouse gas scavenger to the regeneration region. A heater may be provided to heat the greenhouse gas scavenger when in the regeneration region. For example, if the greenhouse gas scavenger is a carbon dioxide scavenger which comprises an amine, then the amine may remove the carbon dioxide by reaction of the amine with carbon dioxide. The carbon dioxide may be subsequently released from the reaction product so formed by heating the reaction product. The apparatus may comprise a receptacle for receiving greenhouse gas released by regeneration of the greenhouse gas scavenger in the regeneration region. The receptacle may comprise a gas cylinder or the like. The heater may be arranged to receive power from the output rotor of the apparatus i.e. the apparatus powers the heater.

The apparatus may comprise a gas outlet. The gas outlet facilitates release of the gas. Such release may be necessary, for example, to inhibit excess pressure build up if the apparatus comprises a container in which a liquid is located. The gas outlet may be provided with a one-way valve to permit egress of gas (for example, from a container) and to resist ingress of any surrounding fluid (such as water).

The apparatus may be located in an aqueous environment. For example, the apparatus may be located at sea, for example, in a littoral or coastal environment. The main body (if present) may be located at or near a bed of an aqueous environment, such as a sea bed or river bed.

The apparatus of the first aspect of the present invention may be used to remove target species other than greenhouse gas from an inlet gas, and therefore the greenhouse gas scavenger may be replaced by a scavenger for removing one or more target species from the inlet gas.

According to a second aspect of the invention there is also provided a method comprising passing an inlet gas comprising greenhouse gas into a liquid, using the buoyancy of the inlet gas to generate power and removing greenhouse gas dioxide from said inlet gas.

Those skilled in the art will realise that the passing of gas, using the buoyancy to generate power and removing greenhouse gas need not be separate steps. For example, the liquid may be suitable for removing greenhouse gas from the inlet gas, and therefore the passing of inlet gas into the liquid causes contact of the inlet gas with the liquid, and therefore causes removal of the greenhouse gas from said inlet gas.

Removal of the greenhouse gas may be by adsorption, absorbing or by reaction.

Greenhouse gas may be removed using a greenhouse gas scavenger, thereby forming a removal product. The greenhouse gas may be any greenhouse gas, but may be one or more of carbon dioxide, methane, nitrous oxide, a chlorofluorocarbon (such as CFC-12), a hydrofluorocarbon (such as HFC-23), sulphur hexafluoride and nitrogen trifluoride. The greenhouse gas may be one or both of carbon dioxide and methane, optionally carbon dioxide, and optionally methane. Removal of greenhouse gas may be done by contacting the greenhouse gas scavenger with the greenhouse gas-containing inlet gas. The greenhouse gas scavenger may be as described in relation to the apparatus of the first aspect of the present invention. Removing greenhouse gas from said inlet gas may therefore comprise reacting the greenhouse gas with a greenhouse gas scavenger to form the removal product. Alternatively or additionally, removing greenhouse gas from said inlet gas may comprise adsorbing or absorbing greenhouse gas with a greenhouse gas scavenger to form the removal product.

The method may comprise heating the greenhouse gas scavenger in a region in which the greenhouse gas scavenger is in contact with greenhouse gas. Such heating may increase the rate of removal of the greenhouse gas.

The method may comprise collecting said inlet gas, optionally in one or more pockets. The collection of the inlet gas facilitates use of the buoyancy of the inlet gas to generate power. The pockets may be located in a liquid which is, or comprises, a greenhouse gas scavenger, such as a carbon dioxide scavenger.

The buoyancy of the inlet gas may produce rotation of an output rotor. For example, the buoyancy of the inlet gas may be used to turn an output rotor. At least some of the bubbles thus formed would typically be collected in a pocket. The collection of the inlet gas (if the gas is collected) may be used to produce rotation of an output rotor. For example, inlet gas may be collected into one or more pockets, the one or more pockets being coupled to the output rotor, optionally via a rotatable main body, for example.

The method may comprise causing a stream of inlet gas to be broken up or at least some bubbles to be broken into smaller bubbles upstream of the pocket. This may be effected using a mesh, for example. The mesh may comprise a two-dimensional mesh or a three-dimensional mesh. A mesh may be interlaced or interwoven, for example. A mesh may be formed from one or more elongate members (such as a ribbon) which is folded, bent or otherwise shaped so as to form a mesh structure. Without wishing to be bound by theory, it is thought that the mesh may provide a suitable surface for the reaction of greenhouse gas with greenhouse gas scavenger. The method may comprise passing the inlet gas into, through or past a gas breaker, such as a mesh or a multi-lobed spinner. A stream of inlet gas may be disrupted and broken into bubbles by the stream passing a multi-lobed spinner. The rotation of the spinner which is caused by the passage of the inlet gas may cause the stream to be "chopped" into bubbles. Similarly, bubbles passing a multi-lobed spinner may be disrupted and broken into smaller bubbles by the rotation of the rotatably-mounted spinner. Without wishing to be bound by theory, it is thought that breaking large bubbles into smaller bubbles or breaking a flow of gas into bubbles increases the surface area of the gas, thereby increasing the reaction area of the gas, and increasing the likelihood of greenhouse gas reacting with a greenhouse gas scavenger.

Causing the stream of inlet gas or at least some of the bubbles to be broken may comprise a first breaking-up of the stream of inlet gas or at least some of the bubbles (for example, by passing at least some of the bubbles through or past a first gas breaker) and a second breaking-up of bubbles (for example, by passing at least some bubbles through or into a second gas breaker). Those skilled in the art will realise that the inlet gas which has passed through or into the second gas breaker may or may not have passed through the first gas breaker, although this may preferably be the case.

The method may comprise treating the removal product to generate the greenhouse gas scavenger. This typically generates greenhouse gas, such as carbon dioxide. The method may therefore comprise collecting greenhouse gas. Treating the product may comprise heating the reaction product, or exposing the product to one or more reagents for generating the greenhouse gas scavenger.

Such treatment of the product may take place in a different region from that in which the greenhouse gas reacts with, or is otherwise taken up by, the greenhouse gas scavenger. The method may therefore comprise transferring the product to a regeneration region for treatment of the product.

The inlet gas may be air, for example, but may be a different gas, for example, a gas which comprises more greenhouse gas than air usually comprises. For example, the inlet gas may be an output gas, for example, from a process such as an industrial process. For example, the inlet gas may comprise an output gas from a process which generates carbon dioxide.

The method may comprise passing inlet gas into or through a mesh, such as a two-dimensional or three-dimensional mesh. Such mesh may be located in one or more pocket, if present. Without wishing to be bound by theory, it is thought that the mesh increases the interaction of the inlet gas with the greenhouse gas scavenger. A mesh may be interlaced or interwoven, for example. A mesh may be formed from one or more elongate members (such as a ribbon) which is folded, bent or otherwise shaped so as to form a mesh structure.

Passing gas into the liquid may be performed using a pump. Passing gas into the liquid may comprise passing gas into the liquid through a gas inlet, optionally via a conduit. Passing gas may be effected using a renewable form of energy, such as solar, wind or wave energy.

As with the apparatus of the first aspect of the present, the method of the second aspect of the present invention may be adapted to remove target species other than greenhouse gas, and so the present invention also provides a method comprising passing an inlet gas comprising one or more target species into a liquid, using the buoyancy of the inlet gas to generate power and removing one or more target species from said inlet gas.

The method of the second aspect of the present invention may be performed using any of the features of the apparatus of the first aspect of the present invention. Furthermore, the method of the second aspect of the present invention may be performed using the apparatus of the first aspect of the present invention.

There is provided in accordance with a third aspect of the present invention, an apparatus for removing greenhouse gas from a greenhouse gas-containing inlet gas, the apparatus comprising a container for the storage of a liquid, a gas inlet for the introduction of a greenhouse gas-containing inlet gas into the liquid, a greenhouse gas scavenger for removing greenhouse gas from the inlet gas, and one or more means for increasing the interaction between the inlet gas and the greenhouse gas scavenger.

Those skilled in the art will realise that the inlet gas is not part of the apparatus of the present invention. Furthermore, the liquid may be part of the apparatus, if the liquid comprises or is the greenhouse gas scavenger.

The means for increasing the interaction between the inlet gas and the greenhouse gas scavenger comprise a stirrer, shaker, vibrator or reciprocator, for example. Such means may provide a surface for the reaction of greenhouse gas scavenger and greenhouse gas. Such means may comprise a mesh, for example, a two-dimensional or three-dimensional mesh. Such means may comprise a gas breaker for breaking-up the stream of gas into bubbles or for breaking up at least some of the bubbles into smaller bubbles. A mesh may be interlaced or interwoven, for example. A mesh may be formed from one or more elongate members (such as a ribbon) which is folded, bent or otherwise shaped so as to form a mesh structure.

Those skilled in the art will realise that the gas breaker should be located in a gas flow path.

The gas breaker may be configured to break the gas stream or at least some bubbles which pass through, past or into said gas breaker.

The or each gas breaker may comprise a mesh. Such a mesh may be a 3D or 2D mesh. The or each gas breaker may comprise a rotatable member, such as a rotatably-mounted multi-lobed spinner. A mesh may be interlaced or interwoven, for example. A mesh may be formed from one or more elongate members (such as a ribbon) which is folded, bent or otherwise shaped so as to form a mesh structure.

The apparatus may comprise a first gas breaker configured to break a stream of gas into bubbles or break at least some bubbles into smaller bubbles which pass therethrough or therepast, and a second gas breaker configured to break a stream of gas or at least some bubbles into smaller bubbles which pass into the second gas breaker. Alternatively or additionally, the apparatus may comprise a first gas breaker configured to break a stream of gas into bubbles or at least some bubbles into smaller bubbles which pass therethrough or therepast, and a plurality of gas breakers, each being configured to break a stream of gas into bubbles or at least some bubbles into smaller bubbles which pass into said second gas breaker.

It is preferred that the one or more means for increasing the interaction between the inlet gas and the greenhouse gas scavenger comprises a mesh, for example, a two-dimensional or three-dimensional mesh. A mesh may be interlaced or interwoven, for example. A mesh may be formed from one or more elongate members (such as a ribbon) which is folded, bent or otherwise shaped so as to form a mesh structure.

The apparatus may comprise at least one pocket for collecting inlet gas which rises through the liquid in which the at least one pocket is locatable. If the means for increasing the interaction between the inlet gas and the greenhouse gas scavenger comprises a mesh, then then mesh may be located in at least one pocket.

The apparatus may comprise as output rotor.

The apparatus may be configured so that collection of inlet gas causes movement of the pocket, the pocket being coupled to the output rotor so that movement of the pocket causes rotation of the output rotor.

The greenhouse gas scavenger may optionally remove the greenhouse gas by reacting with said greenhouse gas. The greenhouse gas may be any greenhouse gas, but may be one or more of carbon dioxide, methane, nitrous oxide, a chlorofluorocarbon (such as CFC-12), a hydrofluorocarbon (such as HFC-23), sulphur hexafluoride and nitrogen trifluoride. The greenhouse gas scavenger may optionally be capable of removing one or both of methane and carbon dioxide. If the greenhouse gas scavenger is a carbon dioxide scavenger, then the carbon dioxide scavenger may comprise a base (such as hydroxide), a $CO_2$-binding mineral or an amine. The amine may additionally comprise at least one —OH group. The amine may be a primary or secondary amine. The amine may be one or more of diethanolamine, monoethanolamine, methyldiethanolamine, diisopropanolamine and aminoethoxyethanol (diglycolamine). Such amines may react with carbon dioxide to form a carbamate. The carbon dioxide scavenger may be provided as, or in, a liquid. For example, the amines mentioned above form aqueous solutions. Alternatively, a solution or suspension of a base may be used. If the greenhouse gas scavenger is provided as, or in, a liquid, then the at least one pocket may be located in said liquid.

The apparatus may comprise a heater for heating the greenhouse gas scavenger in a region in which the greenhouse gas scavenger is in contact with greenhouse gas. The reaction between the greenhouse gas and the greenhouse gas scavenger may be faster at above-ambient temperature. The heater may be powered by the output rotor, if present (for example, indirectly, with motion of the output rotor driving a dynamo or similar which generates power which is used to power the heater).

The apparatus may comprise a plurality of pockets for collecting inlet gas. The plurality of pockets may be mutually spaced. The pockets are optionally coupled so that movement of one pocket (for example, a pocket in which inlet gas has collected) is associated with movement of at least one other, and preferably all of the other, pockets. The pockets may optionally be coupled by virtue of the pockets being associated with a common main body. Those skilled in the art will realise that typically not all of the pockets collect inlet gas at the same time. For example, the apparatus will optionally be configured so that a small number of pockets (for example, one, two or three, and optionally one or two) receive inlet gas at any one point in time.

The at least one pocket (and optionally more than one and optionally each pocket) may be associated with a rotatable main body so that movement of said pocket causes rotation of the main body. The main body may be coupled to the output rotor so that rotation of the main body is associated with rotation of the output rotor. The at least one pocket (and optionally more than one and optionally each pocket) may be coupled to the main body. The at least one pocket (and optionally more than one and optionally each pocket) may, for example, be integral with, or connected to, the main body. The main body is optionally generally disk-shaped.

The main body is typically located in a liquid into which greenhouse gas-containing inlet gas is introduced. The inlet gas rises and collects in one or more pockets. The main body and liquid are optionally located in a container which inhibits loss of the liquid therefrom. The liquid may be, or may comprise, the greenhouse gas scavenger, for example, an amine, such as those discussed above.

The gas inlet may be coupled to a source of inlet gas. The source of inlet gas may comprise a pump or other means for transporting inlet gas to the gas outlet. The source of inlet gas may comprise an intake for receiving gas from the ambient atmosphere. The apparatus may comprise a power source for providing power to the pump or other means for transporting inlet gas. The power source may be a low carbon power source, and may be operable based on wind, wave, tidal, thermal or solar energy. The source of inlet gas may comprise a means for storing inlet gas, such as a gas receptacle, such as a gas cylinder. The pump or other means for transporting inlet gas may be configured to deliver gas to the means for storing gas. The means for storing gas may be configured to deliver stored gas to the gas outlet.

The apparatus may comprise a means for retaining gas in at least one pocket. Such a means for retaining gas in a pocket may increase the time for which gas is in contact with the greenhouse gas scavenger. The means for retaining gas may comprise a porous material i.e. a material having pores. The means for retaining gas in a pocket may be located in a pocket. More than one pocket and optionally each pocket may be provided with means for retaining gas in a pocket. It is also believed that a porous material may facilitate the production of smaller bubbles which may increase the interaction between the gas and any adjacent liquid, which may be beneficial if the liquid is, or contains, a greenhouse gas scavenger.

The apparatus may be provided with gearing to reduce the speed of movement of the pocket. This may assist in retaining the gas in contact with the greenhouse gas scavenger.

The greenhouse gas scavenger may typically require regeneration to regenerate its greenhouse gas removal capability. The apparatus may comprise a regeneration region for the regeneration of the greenhouse gas scavenger. If the greenhouse gas scavenger comprises or is in the form of a liquid, then the regeneration region may be in fluid communication with the region in which the inlet gas is brought into contact with the greenhouse gas scavenger. This facilitates transfer of the greenhouse gas scavenger to the regeneration region. A heater may be provided to heat the greenhouse gas scavenger when in the regeneration region. For example, if the greenhouse gas scavenger comprises an amine, then the amine may remove the greenhouse gas, in this case, carbon dioxide, by reaction of the amine with carbon dioxide. The greenhouse gas may be subsequently released from the reaction product so formed by heating the reaction product. The apparatus may comprise a receptacle for receiving greenhouse gas released by regeneration of the greenhouse gas scavenger in the regeneration region. The receptacle may comprise a gas cylinder or the like. The heater may be arranged to receive power from the output rotor of the apparatus i.e. the apparatus powers the heater.

The apparatus may comprise a gas outlet. The gas outlet facilitates release of the gas. Such release may be necessary, for example, to inhibit excess pressure build up if the apparatus comprises a container in which a liquid is located. The gas outlet may be provided with a one-way valve to permit egress of gas (for example, from a container) and to resist ingress of any surrounding fluid (such as water).

The apparatus may be located in an aqueous environment. For example, the apparatus may be located at sea, for example, in a littoral or coastal environment. The main body (if present) may be located at or near a bed of an aqueous environment, such as a sea bed or river bed.

The apparatus may comprise one or more features of the apparatus described above in relation to the first aspect of the present invention, and may be an apparatus for generating power.

The apparatus of the third aspect of the present invention may be used to extract target species other than greenhouse gas from an inlet gas, and so the present invention also provided an apparatus for removing one or more target species from a target species-containing inlet gas, the apparatus comprising a container for the storage of a liquid, a gas inlet for the introduction of a target species-containing inlet gas into the liquid, a scavenger for removing one or more target species from the inlet gas, and one or more means for increasing the interaction between the inlet gas and the scavenger.

In accordance with a fourth aspect of the present invention, there is provided a method of removing greenhouse gas from a greenhouse gas-containing inlet gas, the method comprising:

Passing the greenhouse gas-containing inlet gas into a liquid; Contacting the greenhouse gas-containing inlet gas with a greenhouse gas scavenger; and Increasing the interaction between the inlet gas and the greenhouse gas scavenger.

The applicant has discovered that by increasing the interaction between the inlet gas and the scavenger, then more greenhouse gas may be removed. The greenhouse gas may be any greenhouse gas, and may be one or more of carbon dioxide, methane, nitrous oxide, a chlorofluorocarbon (such as CFC-12), a hydrofluorocarbon (such as HFC-23), sulphur hexafluoride and nitrogen trifluoride. The greenhouse gas may optionally comprise one or both of methane and carbon dioxide.

For the avoidance of doubt, the term "increasing" refers to an increase compared to the case where such action is omitted. For example, if increasing the interaction between the inlet gas and the greenhouse gas comprises passing inlet gas into or through a mesh, then the increase is to be assessed relative to the case where the gas is not passed into or through a mesh. A mesh may be interlaced or interwoven, for example. A mesh may be formed from one or more elongate members (such as a ribbon) which is folded, bent or otherwise shaped so as to form a mesh structure.

Increasing the interaction may comprise one or more of stirring, vibrating, reciprocating or agitating, for example. Increasing the interaction may comprise passing inlet gas into or through a mesh, such as a two-dimensional or three-dimensional mesh. Without wishing to be bound by theory, it is thought that a mesh may provide a suitable surface for the reaction of greenhouse gas with greenhouse gas scavenger. A mesh may be interlaced or interwoven, for example. A mesh may be formed from one or more elongate members (such as a ribbon) which is folded, bent or otherwise shaped so as to form a mesh structure.

Alternatively or additionally, increasing the interaction may comprise causing a stream of inlet gas to be broken into bubbles or causing at least some of a plurality of bubbles of inlet gas to be broken into smaller bubbles, thereby increasing the surface area of contact between the inlet gas and the greenhouse gas scavenger.

Those skilled in the art will realise that the passing of gas, the contacting of the gas with a greenhouse gas scavenger and increasing the interaction are not necessarily sequential steps. For example, the liquid may comprise or be the greenhouse gas scavenger, in which case passing the greenhouse gas-containing inlet gas into the liquid also contacts the greenhouse gas-containing inlet gas with the greenhouse gas scavenger. The method may therefore comprise passing the greenhouse gas-containing inlet gas into a liquid comprising a greenhouse gas, and increasing the interaction between the inlet gas and the greenhouse gas scavenger, for example, by passing the inlet gas into or through a mesh, such as a two-dimensional mesh or a three-dimensional mesh. A mesh may be interlaced or interwoven, for example. A mesh may be formed from one or more elongate members (such as a ribbon) which is folded, bent or otherwise shaped so as to form a mesh structure.

The inlet gas may be provided either as a stream (essentially a continuous flow of gas until it is caused to be broken) or as a plurality of bubbles.

Increasing the interaction between the inlet gas and the greenhouse gas scavenger may comprise causing the stream of gas or at least some of the bubbles to be broken. This may comprise passing a stream of inlet gas or at least some of the plurality of bubbles through, past or into a gas breaker. This may comprise passing the stream of inlet gas or at least some of the plurality of bubbles through or into a mesh. The mesh may be a 2D or 3D mesh. A mesh may be interlaced or interwoven, for example. A mesh may be formed from one or more elongate members (such as a ribbon) which is folded, bent or otherwise shaped so as to form a mesh structure. Alternatively, causing the stream of inlet gas or at least some of the bubbles to be broken may comprise passing the bubbles past a rotating member, such as a rotatable multi-lobed spinner. Causing a stream of gas to be broken typically causes the formation of bubbles.

Causing the stream of inlet gas or at least some of the bubbles to be broken may comprise a first breaking-up of the stream of gas or at least some of the bubbles (for example, by passing at least some of the bubbles through or past a first gas breaker) and a second breaking-up of bubbles (for example, by passing at least some bubbles through, past or into a second gas breaker). Those skilled in the art will realise that the gas which has passed through, past or into the second gas breaker may or may not have passed through or part the first gas breaker, although this may be the case.

The method may comprise using the buoyancy of the gas to generate power, such as electrical power.

Those skilled in the art will realise that the buoyancy to generate power need not be a separate step. For example, the liquid may comprise the greenhouse gas scavenger, and therefore in using the buoyancy to generate power, the gas is in contact with the liquid, and therefore the gas is in contact with the greenhouse gas scavenger.

The greenhouse gas scavenger may, for example react with the greenhouse gas, thereby forming a removal product. The greenhouse gas scavenger may be as described in relation to the apparatus of the first aspect of the present invention. Contacting the greenhouse gas scavenger with the greenhouse gas may therefore comprise reacting the greenhouse gas with the greenhouse gas scavenger to form the removal product. Alternatively or additionally, contacting the greenhouse gas scavenger with the greenhouse gas may comprise adsorbing or absorbing greenhouse gas with the greenhouse gas scavenger to form the removal product.

The method may comprise heating the greenhouse gas scavenger in a region in which the greenhouse gas scavenger is in contact with greenhouse gas. Such heating may increase the rate of removal of the greenhouse gas.

The method may comprise collecting said inlet gas, optionally in one or more pockets. The collection of the gas facilitates use of the buoyancy of the inlet gas to generate power. The pockets may be located in a liquid which is, or comprises, a greenhouse gas scavenger.

The buoyancy of the inlet gas may produce rotation of an output rotor. For example, the buoyancy of the inlet gas may be used to turn an output rotor. The collection of the inlet gas (if the inlet gas is collected) may be used to produce rotation of an output rotor. For example, inlet gas may be collected into one or more pockets, the one or more pockets being coupled to the output rotor, optionally via a rotatable main body, for example.

The method may comprise treating the removal product to generate the greenhouse gas scavenger. This typically generates greenhouse gas. The method may therefore comprise collecting greenhouse gas. Treating the product may comprise heating the reaction product, or exposing the product to one or more reagents for generating the greenhouse gas scavenger.

Such treatment of the product may take place in a different region from that in which the greenhouse gas reacts with, or is otherwise taken up by, the greenhouse gas scavenger. The method may therefore comprise transferring the product to a regeneration region for treatment of the product.

The inlet gas may be air, for example, but may be as described above in relation to the method of the second aspect of the present invention.

Passing inlet gas into the liquid may be performed using a pump. Passing inlet gas into the liquid may comprise passing inlet gas into the liquid through a gas inlet, optionally via a conduit. Passing inlet gas may be effected using a renewable form of energy, such as solar, wind or wave energy.

The method of the fourth aspect of the present invention may be adapted to remove target species other than greenhouse gas, and therefore the present invention provides a method of removing one or more target species gas from a target species-containing inlet gas, the method comprising:
Passing the target species-containing inlet gas into a liquid;
Contacting the target species-containing inlet gas with a scavenger for removing one or more target species form the inlet gas; and
Increasing the interaction between the inlet gas and the scavenger.

The method of the fourth aspect of the present invention may comprise one or more features of the apparatus of the third aspect of the present invention. Similarly, the apparatus of the third aspect of the present invention may be used in the method of the fourth aspect of the present invention. Likewise, the method of the fourth aspect of the present invention may comprise any one or more of the features of the method of the second aspect of the present invention, and vice versa.

There is provided in accordance with a fifth aspect of the present invention, an apparatus for removing greenhouse gas from a greenhouse gas-containing inlet gas, the apparatus comprising a container for the storage of a liquid, a gas inlet for the introduction of a greenhouse gas-containing inlet gas into the liquid, a greenhouse gas scavenger for removing greenhouse gas from the inlet gas, and a mesh for the passage of inlet gas into or therethrough.

Without wishing to be bound by theory, the applicant understands that a mesh (such as a three-dimension mesh) is effective at increasing the interaction between the greenhouse gas scavenger and the inlet gas, particularly (but not exclusively) if the greenhouse gas scavenger is provided in the liquid. A mesh may be interlaced or interwoven, for example. A mesh may be formed from one or more elongate members (such as a ribbon) which is folded, bent or otherwise shaped so as to form a mesh structure.

The mesh may be located in a pocket, for example, as described above in relation to the apparatus of the first and third aspects of the present invention.

The apparatus of the fifth aspect of the present invention may be adapted to remove target species other than greenhouse gas from an inlet gas, and so the invention may provide an apparatus for removing one or more target species from a target species-containing inlet gas, the apparatus comprising a container for the storage of a liquid, a gas inlet for the introduction of a target species-containing inlet gas into the liquid, a scavenger for removing one or more target species from the inlet gas, and a mesh for the passage of inlet gas into or therethrough.

The apparatus of the fifth aspect of the present invention may comprise one or more features of the apparatus of the first and/or third aspects of the present invention.

In accordance with a sixth aspect of the present invention, there is provided a method of removing greenhouse gas from a greenhouse gas-containing inlet gas, the method comprising:
Passing the greenhouse gas-containing inlet gas into a liquid;
Contacting the greenhouse gas-containing inlet gas with a greenhouse gas scavenger; and
Passing the greenhouse gas-containing inlet gas through or into a mesh.

Without wishing to be bound by theory, the applicant understands that a mesh (such as a three-dimension mesh) is effective at increasing the interaction between the greenhouse gas scavenger and the inlet gas, particularly (but not exclusively) if the greenhouse gas scavenger is provided in the liquid. A mesh may be interlaced or interwoven, for example. A mesh may be formed from one or more elongate members (such as a ribbon) which is folded, bent or otherwise shaped so as to form a mesh structure.

The greenhouse gas may be any greenhouse gas, and may be one or more of carbon dioxide, methane, nitrous oxide, a chlorofluorocarbon (such as CFC-12), a hydrofluorocarbon (such as HFC-23), sulphur hexafluoride and nitrogen trifluoride.

Those skilled in the art will realise that the passing of gas into a liquid, the contacting of inlet gas and passing of inlet gas through or into a mesh need not be separate, sequential steps. For example, if the liquid comprises the greenhouse gas scavenger, the passing of inlet gas into the liquid brings the inlet gas into contact with the greenhouse gas scavenger. In this case, the method comprises passing the greenhouse gas-containing inlet gas into a liquid which comprises a greenhouse gas scavenger, and passing the greenhouse gas-containing inlet gas through or into a mesh.

The mesh may be located in a pocket, for example, as described above in relation to the apparatus of the first and/or third aspects of the present invention, and in relation to the methods of the second and/or fourth aspects of the present invention.

The method of the sixth aspect of the present invention may be used to remove target species other than greenhouse gas from an inlet gas, and so the present invention also provides a method of removing one or more target species from a target species-containing inlet gas, the method comprising:
Passing the target species-containing inlet gas into a liquid;
Contacting the target species-containing inlet gas with a scavenger for removing one or more target species from the inlet gas; and
Passing the target species-containing inlet gas through or into a mesh.

The method of the sixth aspect of the present invention may comprise one or more features of the method of the second and/or fourth aspects of the present invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
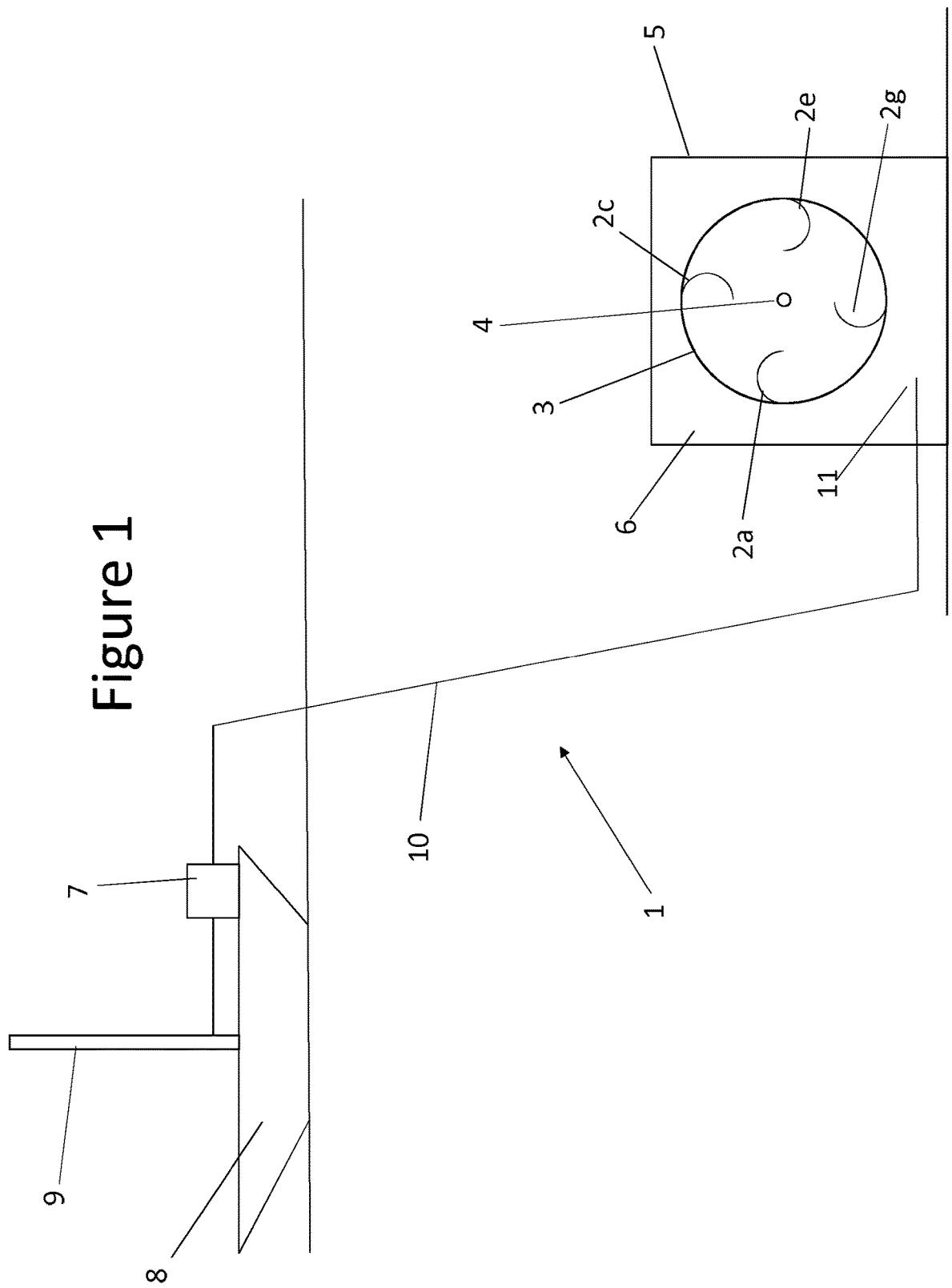
FIG. 1 shows a schematic view of an apparatus according to a first embodiment of the invention.
Figure 2:
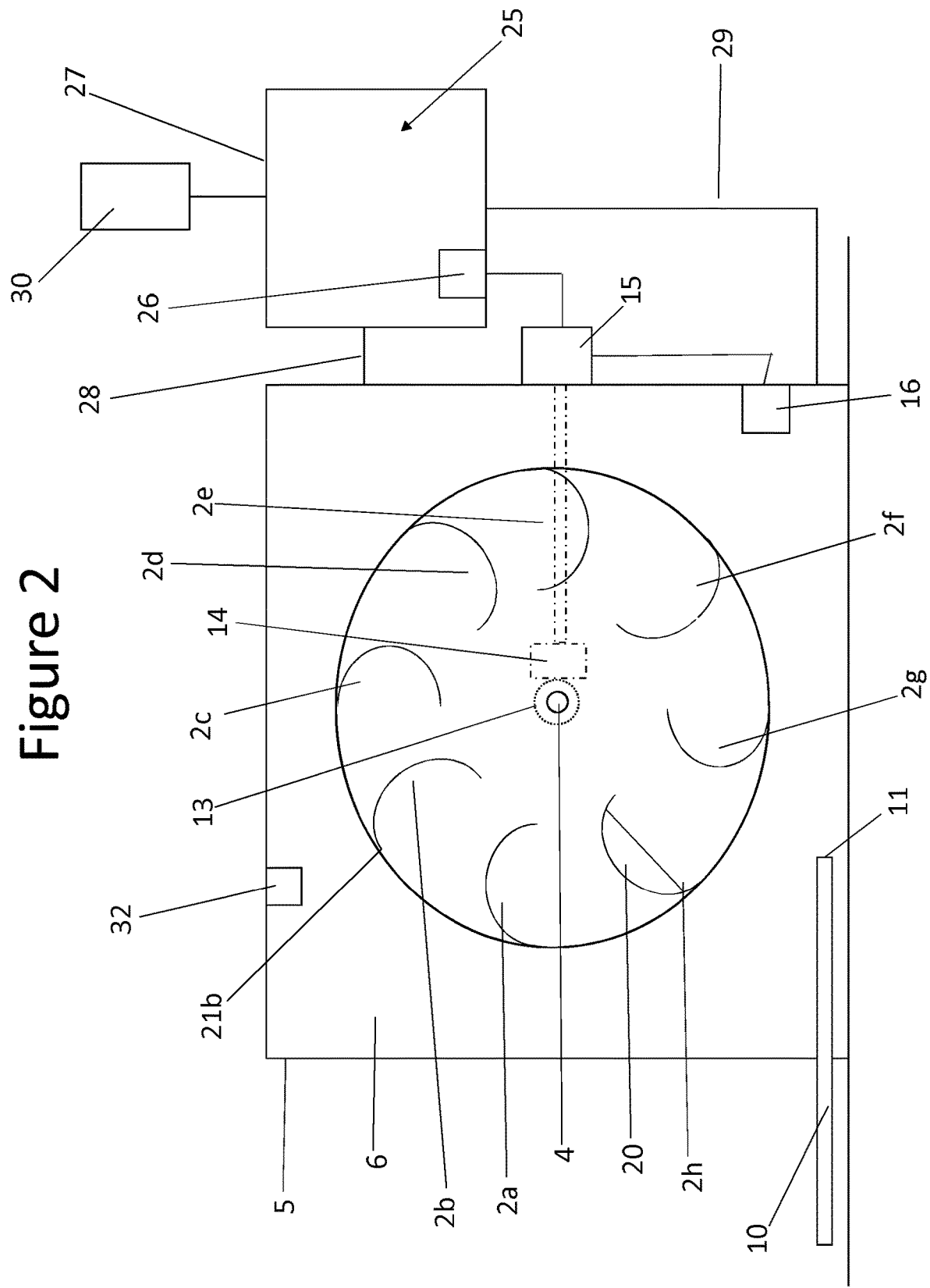
FIG. 2 shows a schematic view of a portion of the apparatus of FIG. 1.

An exemplary embodiment of an apparatus in accordance with both the first, third and fifth aspects of the present invention will now be described with reference to FIGS. 1 and 2. The apparatus is denoted generally by reference numeral 1. The apparatus 1 comprises a plurality of pockets, only eight of which 2a-2h are shown in FIG. 2 and only four being shown in FIG. 1. The hemi-cylindrical pockets 2a-2h are circumferentially arranged around main body 3, between two face-forming sheets (not shown). The main body 3 is essentially disk-shaped and is rotatably mounted on output rotor 4. Main body 3 is located in a container 5 of an aqueous solution of monoethanolamine 6, a carbon dioxide scavenger, the container 5 being located on the sea floor in shallow sea water. The apparatus 1 also comprises air pump 7 which is located on a small floating platform 8. The pump 7 is powered by a small wind turbine/windmill 9, and delivers air (containing carbon dioxide) through conduit 10 to gas inlet 11 located at the bottom of container 5. Gas introduced through gas inlet 11 passes into pocket 2h and the buoyancy of the gas exerts an upwards force on the pocket 2h. This force is transferred to the rotatably-mounted main body 3, and the main body 3 rotates. This rotation causes rotation of output rotor 4, the rotation of which may be used to generate power. In the present example, output rotor 4 is provided with a gear 13 which is meshed with gear 14 which is coupled to dynamo 15. Rotation of gear 13 causes rotation of gear 14 and rotation of drive shaft (not shown) of dynamo 15. Therefore, the buoyancy of the carbon dioxide containing gas may be used to generator electricity. The gears 13, 14 may be chosen to apply a resistance to rotation of main body 3. It may be desirable to apply a resistance to rotation of main body 3 in order to slow rotation speed, thereby retaining the carbon dioxide containing gas in contact with the solution of monoethanolamine for a longer period of time.

The apparatus 1 comprises heater 16 which is configured to heat the solution of monoethanolamine located in container 5, and which is powered by dynamo 15. It may be desirable to heat the monoethanolamine solution 6 to increase the reactivity of the monoethanolamine with the carbon dioxide, and thereby increase the amount of carbon dioxide which is removed from the gas. The heater 16 may be configured to heat the monoethanolamine to about 25-40° C., for example. The concentration of the monoethanolamine may be, for example, any suitable concentration, but may typically be from 3-50 wt %.

Each pocket 2a-2h is provided with a three-dimensional mesh 120, formed from a plastic scourer. For the purpose of clarity only pocket 2h is shown containing the mesh. Without wishing to be bound by theory, it is thought that the mesh 20 increases the interaction between the inlet gas and the liquid which comprises the monoethanolamine, and/or the mesh 20 provides a surface which may be releasably coated with monoethanolamine by the liquid. It is also thought (once again, without wishing to be bound by theory) that the mesh 20 breaks larger bubbles into smaller ones, thereby increasing the interaction between the gas and the surrounding liquid.

Referring to FIG. 2, the apparatus is arranged so that bubbles rising from inlet 11 are received in the right hand side of pocket 2h. As the main body 3 rotates and pocket 2h rotates and rises, gas passes through mesh 20 and leaves pocket 2h from the left hand lip (not shown). Without wishing to be bound by theory, it is believed that this arrangement slows the inlet gas down, increasing residence time in the pocket 2h, which facilitates increased reaction between the monoethanolamine and the carbon dioxide in the gas.

When the monoethanolamine reacts with carbon dioxide it forms a reaction product in the form of a carbamate. That carbamate group cannot react further with carbon dioxide and therefore it is desirable to regenerate the monoethanolamine from the carbamate. This is usually done by heating the carbamate to 110-125° C. In order to facilitate this, the apparatus 1 comprises a regeneration region 25 which is in fluid communication with container 5 via conduit 28. The regeneration region 25 is provided for the regeneration of the monoethanolamine from the carbamate. After a certain period of use, some of the contents of container 5 are transferred to regeneration region 25. The regeneration region 25 is provided with a heater 26 to heat the contents of the regeneration region 25. Heater 26 is powered by dynamo 15. Heating of the carbamate to about 110-125° C. forms monoethanolamine and releases carbon dioxide which is collected in gas canister 30. The monoethanolamine is then returned to container 5 via conduit 29.

Gas leaving the pockets 2a-2h collects in the top portion of container 5, and leaves the container 5 via gas outlet 32 which is provided with a one-way valve (not shown) which is configured to release gas from container 5 but inhibit ingress of water.

Figure 3:
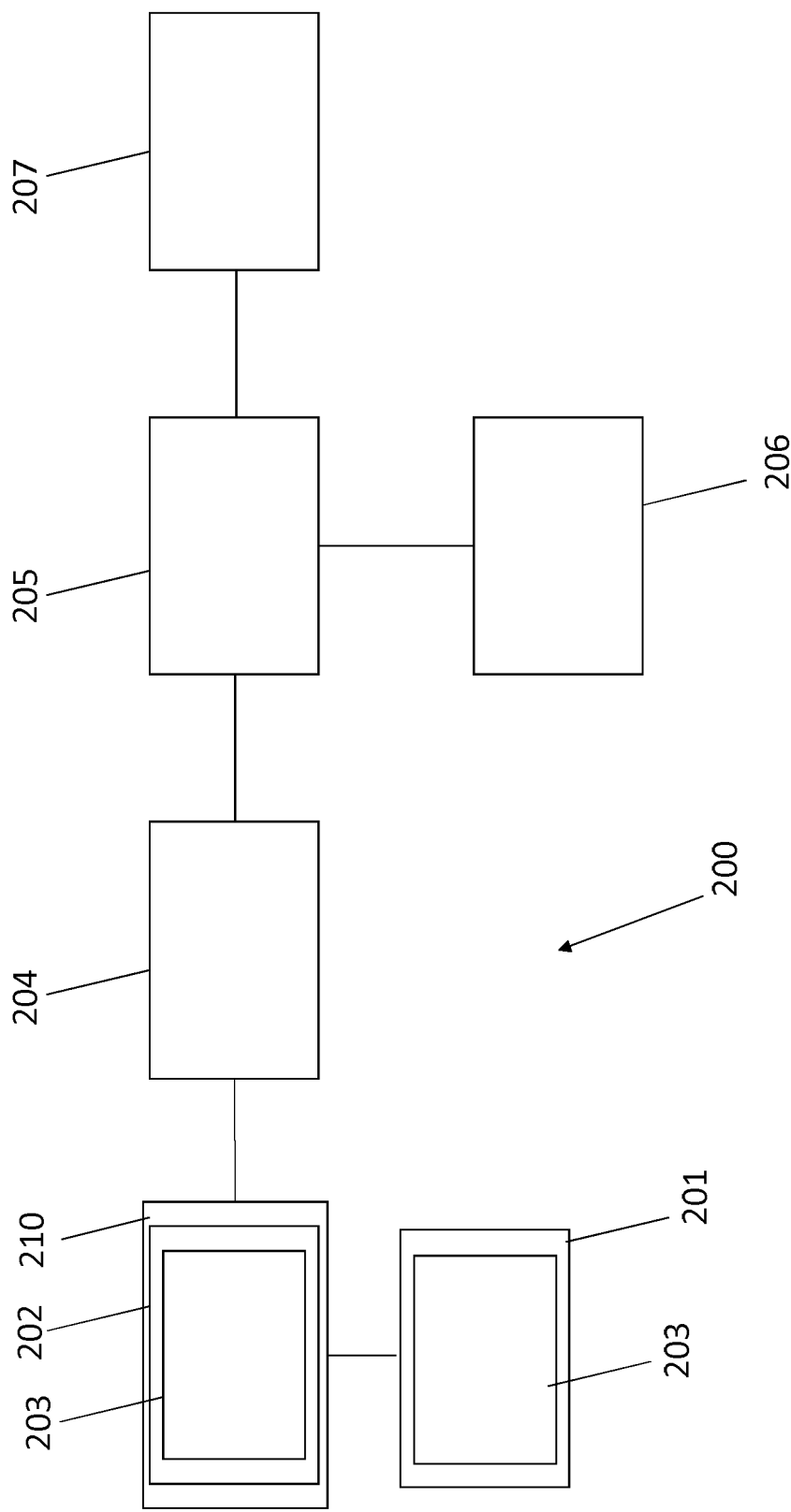
FIG. 3 is a schematic representation of a method according to an embodiment of the invention.

An exemplary method of the second, fourth and sixth aspects of the present invention will now be described with reference to FIG. 3. The method is denoted generally by reference numeral 200. The method 200 comprises passing 201 a gas into a liquid, and using 202 the buoyancy of the gas in the liquid to generate power. When the gas is passed into the liquid carbon dioxide in the gas is removed 203 by reaction with the monoethanolamine to form a carbamate. Furthermore, when the buoyancy of the gas is used to generate power, the gas is collected in pockets as described above. When the gas is in the pockets, it is in contact with the surrounding monoethanolamine solution, and therefore carbon dioxide in the gas is removed 203 by reaction with the monoethanolamine. Furthermore, passage on the inlet gas into the pocket passes the gas into a three-dimensional mesh (not labelled in FIG. 3) located in the pocket which increases 210 the interaction between the inlet gas and the monoethanolamine solution. As mentioned above, after a certain amount of time, liquid comprising the carbamate reaction product is transferred 204 to a regeneration region in which the monoethanolamine is regenerated 205 by heating the carbamate. Gaseous carbon dioxide is collected 207 and monoethanolamine is transferred 206 back to the region in which monoethanolamine is reacted with the carbon dioxide.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The example described above illustrates an apparatus and method which generate power. Those skilled in the art will realise that for the apparatus and method of the third, fourth, fifth and sixth aspects of the present invention, then there is no need for the apparatus and method to generate power because the apparatus and method of the third and fourth aspects of the present invention respectively are concerned with causing the increase of interaction between the inlet gas and the greenhouse gas scavenger.

The example above describes an apparatus with a rotatable main body. Those skilled in the art will realise that other configurations are possible for apparatus in accordance with the first aspect of the present invention. For example, a plurality of pockets may be attached to a belt with two rotors, for example, as shown in WO2008/082221.

Those skilled in the art will realise that other arrangements of pockets may be used. For example, the pockets may be hemi-spherical.

The example above illustrates how carbon dioxide may be removed from an inlet gas. Those skilled in the art will realise that the example may be suitably modified to facilitate removal of other greenhouse gases, such as nitrous oxide, a chlorofluorocarbon, a hydrofluorocarbon, sulphur hexafluoride, nitrogen trifluoride or methane. For example, hydroxyl radicals may be used to remove methane.

The example above describes the use of a three-dimensional mesh in the form of a plastic scourer. Those skilled in the art will realise that other meshes may be used. For example, a mesh may be formed from a ribbon, a string or the like which is folded, coiled or otherwise shaped to form a three-dimensional mesh structure.

The example above describes the use of monoethanolamine solution to remove carbon dioxide from a gas. Those skilled in the art will realise that other materials may be used to remove the carbon dioxide, such as other amines, a base (such as a hydroxide solution or suspension) or a suitable carbon-dioxide binding mineral.

The example above describes the use of wind power to power a pump to provide air to the pockets of the apparatus. Those skilled in the art will realise that any suitable power source may be used to power the pump, but may typically comprise a "green" or renewal source of power, such as waves, tidal or solar.

The example above describes the use of the apparatus and method of the present invention in littoral (i.e. coastal) waters. Those skilled in the art will realise that the apparatus and method of the present invention may be used essentially anywhere, and typically on land, in which case the floating platform described above would not be needed.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An apparatus for generating power comprising:
   at least one pocket for collecting inlet gas which rises through a liquid in which the at least one pocket may be located;
   an output rotor; and
   a greenhouse gas scavenger for removing greenhouse gas from the inlet gas;
   the apparatus being configured so that collection of inlet gas causes movement of the at least one pocket, the at least one pocket being coupled to the output rotor so that movement of the at least one pocket causes rotation of the output rotor;
   wherein the apparatus comprises a mesh for passage of inlet gas into or therethrough.

2. An apparatus according to claim 1, wherein the greenhouse gas scavenger is a carbon dioxide scavenger and comprises a base, a CO2-binding mineral or an amine.

3. An apparatus according to claim 1, wherein the greenhouse gas scavenger is provided as, or in, a liquid, and the at least one pocket is located in said liquid.

4. An apparatus according to claim 1, further comprising a heater for heating the greenhouse gas scavenger in a region in which the greenhouse gas scavenger is in contact with greenhouse gas.

5. An apparatus according to claim 1, wherein the at least one pocket is associated with a rotatable main body so that movement of said pocket causes rotation of the main body.

6. An apparatus according to claim 1, further comprising a gas breaker for breaking a stream of inlet gas into bubbles or for breaking bubbles of inlet gas into smaller bubbles, the gas breaker being located in the gas flow path upstream of the pocket.

7. An apparatus according to claim 1, further comprising one or more means for increasing the interaction between the inlet gas and the greenhouse gas scavenger.

8. An apparatus according to claim 1, further comprising a regeneration region for the regeneration of the greenhouse gas scavenger.

9. An apparatus according to claim 8, further comprising a heater for heating the greenhouse gas scavenger when in the regeneration region.

10. An apparatus according to claim 1, wherein the mesh being a three-dimensional mesh.

11. An apparatus according to claim 1, wherein the mesh is located in a pocket.

12. An apparatus according to claim 11, wherein the greenhouse gas scavenger removes greenhouse gas by reacting with, or adsorbing or absorbing, said greenhouse gas.

13. An apparatus according to claim 10, wherein the mesh is located in a pocket.

14. An apparatus for generating power comprising:
    at least one pocket for collecting inlet gas which rises through a liquid in which the at least one pocket may be located;
    an output rotor; and
    a greenhouse gas scavenger for removing greenhouse gas from the inlet gas;
    the apparatus being configured so that collection of inlet gas causes movement of the at least one pocket, the at least one pocket being coupled to the output rotor so that movement of the at least one pocket causes rotation of the output rotor;
    wherein the apparatus comprises a regeneration region for the regeneration of the greenhouse gas scavenger.

15. An apparatus according to claim 14, wherein the greenhouse gas scavenger removes greenhouse gas by reacting with, or adsorbing or absorbing, said greenhouse gas.

16. An apparatus according to claim 14, wherein the greenhouse gas scavenger is a carbon dioxide scavenger and comprises a base, a CO2-binding mineral or an amine.

17. An apparatus according to claim 14, wherein the greenhouse gas scavenger is provided as, or in, a liquid, and the at least one pocket is located in said liquid.

18. An apparatus according to claim 14, further comprising a heater for heating the greenhouse gas scavenger in a region in which the greenhouse gas scavenger is in contact with greenhouse gas.

19. An apparatus according to claim 14, further comprising a gas breaker for breaking a stream of inlet gas into bubbles or for breaking bubbles of inlet gas into smaller bubbles, the gas breaker being located in the gas flow path upstream of the pocket.

20. An apparatus according to claim 14, further comprising one or more means for increasing the interaction between the inlet gas and the greenhouse gas scavenger.

\* \* \* \* \*